(12) United States Patent
Adamopoulos et al.

(10) Patent No.: US 11,015,436 B2
(45) Date of Patent: May 25, 2021

(54) METHOD FOR EVALUATING AND MONITORING FORMATION FRACTURE TREATMENT USING FLUID PRESSURE WAVES

(71) Applicant: Seismos Inc., Austin, TX (US)

(72) Inventors: Panagiotis Adamopoulos, Lakeway, TX (US); Jim Cannon, Spring, TX (US); Jakub Felkl, Austin, TX (US)

(73) Assignee: Seismos Inc., Austin, TX (US)

( * ) Notice: Subject to any disclaimer, the term of this patent is extended or adjusted under 35 U.S.C. 154(b) by 88 days.

(21) Appl. No.: 15/832,979

(22) Filed: Dec. 6, 2017

(65) Prior Publication Data

US 2018/0094521 A1    Apr. 5, 2018

Related U.S. Application Data

(63) Continuation of application No. PCT/US2016/067290, filed on Dec. 16, 2016.

(60) Provisional application No. 62/268,916, filed on Dec. 17, 2015.

(51) Int. Cl.
| | | |
|---|---|---|
| *E21B 47/107* | (2012.01) | |
| *E21B 43/26* | (2006.01) | |
| *G01V 1/30* | (2006.01) | |
| *E21B 47/18* | (2012.01) | |
| *G01V 1/18* | (2006.01) | |

(52) U.S. Cl.
CPC ............ *E21B 47/107* (2020.05); *E21B 43/26* (2013.01); *E21B 47/18* (2013.01); *G01V 1/308* (2013.01); *G01V 1/181* (2013.01); *G01V 2200/14* (2013.01); *G01V 2210/1234* (2013.01); *G01V 2210/6122* (2013.01)

(58) Field of Classification Search
CPC ......... E21B 43/26; E21B 47/101; E21B 49/00
See application file for complete search history.

(56) References Cited

U.S. PATENT DOCUMENTS

| | | |
|---|---|---|
| 4,858,130 A | 8/1989 | Widrow |
| 4,907,204 A | 3/1990 | Medlin |
| 4,964,101 A | 10/1990 | Liu et al. |

(Continued)

OTHER PUBLICATIONS

International Search Report and Written Opinion, International Application No. PCT/US2016/067290 dated Apr. 14, 2017.

(Continued)

*Primary Examiner* — Robert E Fuller
(74) *Attorney, Agent, or Firm* — Richard A. Fagin

(57) ABSTRACT

A method for evaluating a wellbore treatment includes inducing an acoustic wave in the wellbore prior to treatment. Acoustic energy propagating as pressure waves in the wellbore is detected. A formation in fluid communication with the wellbore is treated. The inducing an acoustic wave and detecting acoustic energy are repeated. A characteristic of the treatment is determined based on differences between the detected acoustic energy prior to the treating and at the end of the treating. In some embodiments, the observed differences are then also compared to differences observed in prior treatment stages to assess benefit of changes to treatment design. In some embodiments, the treatment design parameters are continuously iterated, adjusted, and improved to maximize the contribution to production of all subsequent stages in same or any other well.

10 Claims, 9 Drawing Sheets

(56) References Cited

U.S. PATENT DOCUMENTS

| | | | |
|---|---|---|---|
| 5,093,811 A * | 3/1992 | Mellor | E21B 43/26 |
| | | | 181/105 |
| 7,819,188 B2 | 10/2010 | Auzerais et al. | |
| 2005/0246131 A1 | 11/2005 | Segal et al. | |
| 2006/0034152 A1 | 2/2006 | Korneev | |
| 2009/0159272 A1 | 6/2009 | Auzeris et al. | |
| 2012/0075952 A1 | 3/2012 | Johnson et al. | |
| 2013/0079935 A1 | 3/2013 | Kabbanik et al. | |
| 2014/0202687 A1 | 7/2014 | Dorovsky | |
| 2014/0369165 A1 | 12/2014 | Shina | |
| 2015/0103624 A1 | 4/2015 | Thompson et al. | |
| 2016/0108705 A1 * | 4/2016 | Maxwell | E21B 43/267 |
| | | | 166/250.1 |

OTHER PUBLICATIONS

Examination Report, Canadian Application No. 3,008,438 dated Apr. 10, 2019.
Office Action for Canadian Application No. 3,008,438 dated Dec. 19, 2019.

* cited by examiner

METHOD FOR EVALUATING AND MONITORING FORMATION FRACTURE TREATMENT USING FLUID PRESSURE WAVES

CROSS REFERENCE TO RELATED APPLICATIONS

Continuation of International (PCT) Application No. PCT/US2016/067290 filed on Dec. 16, 2016. Priority is claimed from U.S. Provisional Application No. 62/268,916 filed on Dec. 17, 2015.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of hydraulic fracturing of subsurface earthen formations. More specifically, the disclosure relates to the use of pressure waves to evaluate and monitor the effectiveness of fracture treatments (stimulations, completions) within a particular wellbore or wellbores.

Hydraulic fracturing of an extended reach lateral wellbore may include as many as 100 or more individual stages. Such fracture treatment may take several days and cost the operator as much as several million dollars. Fracture treatment design is difficult due to the fact that in many reservoir formations, the rock properties change between the position of the surface location of a well and a different geodetic location at the bottom of the wellbore, e.g., along the lateral portion of a highly inclined or horizontal wellbore. Further, a reservoir formation may have variable rock properties over the geologic extent of the reservoir formation. A fracture treatment design that works in one area or one well does not always effectively work in another area or well. Such variability in effectiveness of fracture treatments makes it challenging to design and adjust the specific parameters of each fracture stage to generate a desired large interconnected fracture network with each stage as fracture treatment progresses from the "toe" (bottom or most distant point from the surface) to the "heel" (where the wellbore is turned from vertical to laterally) of a lateral or horizontal wellbore.

Fracture treated wells may not obtain their pre-drill production targets. For example, a fracture may form but does not remain propped open once fracturing hydraulic pressure is reduced to allow reservoir fluid to flow through the fracture toward the wellbore. In such case, the fracture is not effective because it does not contribute to the total flow of reservoir fluid into that wellbore. One large provider of hydraulic fracturing services estimates that as many as 4 out of 10 fracture stages are not effective, and do not contribute significantly to flow when the well is put on production (several days to weeks after fracture treatment is completed).

U.S. Pat. No. 4,802,144 and similar patents issued to Holzhausen et al. rely on hydraulic impedance methods and models to evaluate induced fractures. The '144 patent discloses a method intended to distinguish more detailed geometry (length, height, width) and fracture orientation based on excited oscillations induced from the surface by closest-matching with reasonable, a priori theoretical models/shapes of fractures. Without trying to know the precise geometry and orientation using ground-based seismic sensor arrays of the fractures as described, which is interesting but not directly related to the fluid production from a well, what is disclosed in the '144 patent does not disclose evaluating the (hydraulically) "connected rock volume" or extent of fracture in a reservoir formation in a less granular but more practical way. A parameter related to increased production or drainage from a fractured reservoir formation is the "effective connected rock volume" (ECRV), that is, the hydraulically-connected volume of rock that allows fluids to flow into the well from the reservoir formation to contribute to production. Additionally, the method disclosed in the '144 patent uses hydraulic measures and flow rates, whereas methods according to the present disclosure use acoustic-type measurements in a fluid-filled wellbores.

U.S. Pat. No. 5,081,613 issued to Holzhausen et al. describes a method for identification of well irregularities while U.S. Pat. No. 5,206,836 issued to Holzhausen et al. focuses on determination of fracture closure pressure from a moment at which fundamental resonant frequencies change from those of an open fracture to those of a closed fracture. Both of these methods are based on using resonant and harmonic hydraulic properties of a well combined with a model. Similarly, U.S. Pat. No. 4,783,769 issued to Holzhausen relies on the same model, representative of a single fracture but not always the case for a more complex fracture network.

U.S. Patent Application Publication No. 2013/0079935 filed by Kabannik et al. discloses a method for real time diagnosis of hydraulic fracturing operations which consists of analyzing measurements from two techniques in a simultaneous manner: microseismic activity generated during the fracturing operation, and reflections from low frequency pressure waves (tube waves) generated and propagating in the wellbore and reflecting from fractures, obstacles in the wellbore, completion segments, etc. This combination of monitoring techniques provides simultaneous information about the effect of the fracturing operation in the formation, at distances ranging typically from 15 to 300 meters away from the wellbore from microseismic monitoring, with information about the connectivity of the fracture at the wellbore from monitoring the low frequency waves. The method disclosed in the '935 publication requires several coinciding data streams (seismic measurements from e.g., geophones and pressure measurements related to tube waves). The disclosed method in the '935 publication does not compare the measurements themselves from stage or well to stage or well, nor does it disclose using only tube waves for the diagnosis.

U.S. Pat. No. 4,858,130 issued to Widrow describes a method for estimating fracture geometry using swept pump frequencies using downhole sensors and several surface transducers, which may be impractical and expensive for typical fracture treatment operations.

U.S. Pat. No. 6,724,687 B1 issued to Stephenson and Loth describes a processing method for well characterization by superimposing high and low frequency signals sent into a wellbore, decoupling them, and estimating fracture parameters as well as performing closure pressure measurements.

U.S. Pat. No. 5,093,811 issued to Mellor describes a method for fracture height and length measurements using a resonance-sweep technique. The disclosed method uses a model and swept frequencies to induce standing waves in a wellbore and determining dimension when compared with a model. U.S. Pat. No. 5,170,378 issued to Mellor discloses a method that also relies on building a theoretical model of wellbore-fracture system having hydraulic impedance as a parameter. The data-matching of measured with model data enables estimating the fracture geometry. Data is obtained using pressure transducers. The '378 patent also discloses measuring delay time between fracture tip and fracture mouth as an estimate of fracture length. The disclosed method does include a preparatory step of inducing a hydraulic pulse and its measurement, but further use is not essential to the method disclosed in the '378 patent. Effective volume is often more important in determining resource recovery.

BRIEF DESCRIPTION OF THE DRAWINGS

FIG. 3B shows a model for no fracture; FIG. 4B shows a similar model with a fracture intersecting the wellbore in the horizontal section.

DETAILED DESCRIPTION

Figure 1:
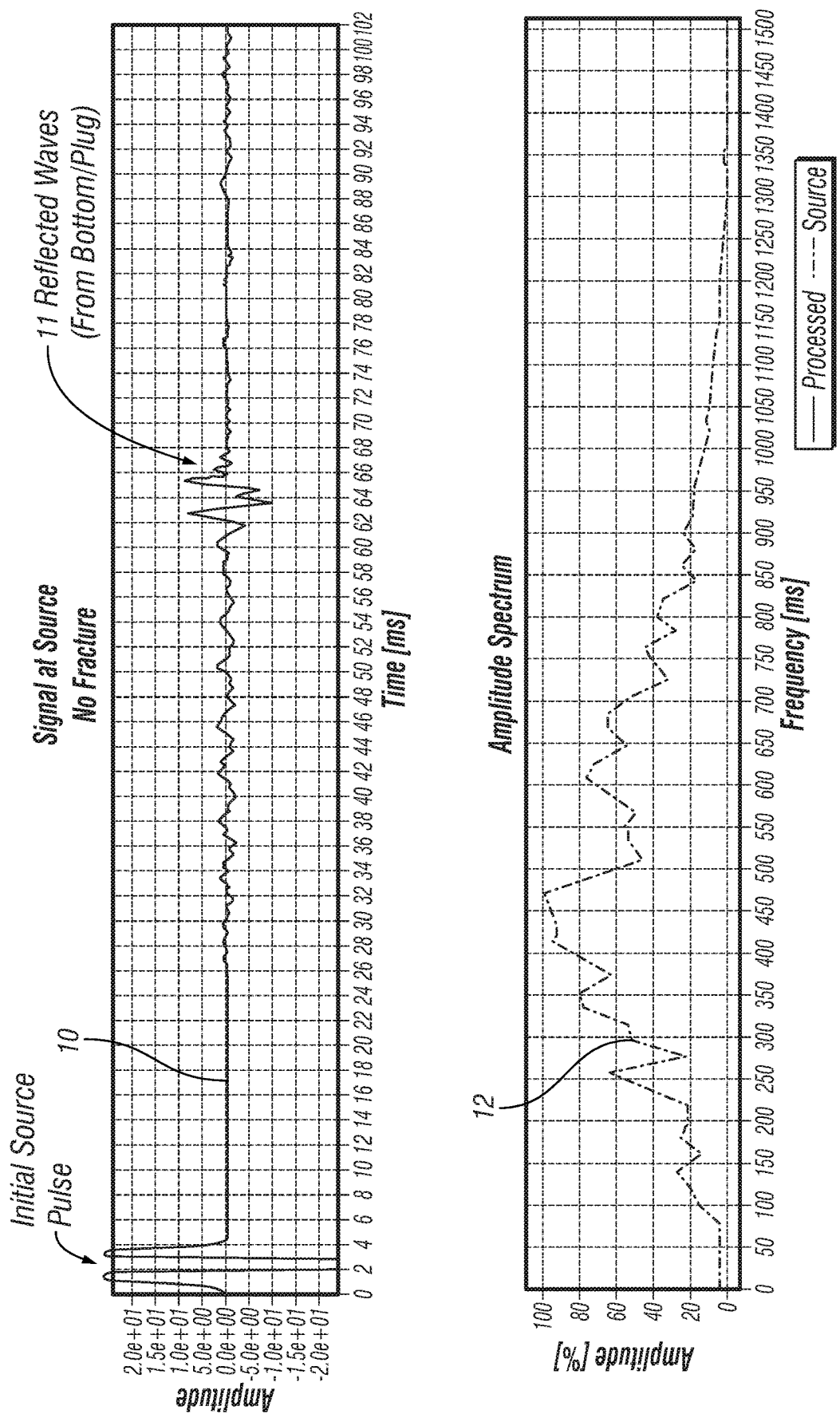
FIG. 1 shows an example graph of a pressure wave induced in a wellbore with respect to time for a well having no fracture treatment and a graph of amplitude with respect to frequency of the pressure wave in the wellbore.

Methods according to the present disclosure may include a "baseline" measurement that may be generated using data and measurements from other wells (or experience, prior production data, traces from distributed acoustic/temperature or other sensors), averages, and additional analysis to empirically estimate fracture treatment effectiveness. Methods according to the present disclosure may use measurements from an untreated well, similar well, or for a fracture stage prior to pumping any fracture treatment material, or prior to any one or more fracture treatment stages in a wellbore intended to have multiple fracture treatment states. A set of one or more such measurements can represent a baseline. The baseline may also include measurements made prior to re-fracturing treatment of a well interval that was previously fracture treated.

In making baseline measurements, a pressure wave may be induced in the wellbore by exciting an acoustic source in the wellbore or at the ground surface proximate the wellbore. A pressure wave may also be induced in a body of fluid proximate a wellbore drilled below the bottom of a body of water, such as a near wellbore or wellbore-intersecting fracture. The pressure wave may excite tube waves in the wellbore. Acoustic measurements may be made at selected positions in and along the interior of the wellbore and in some embodiments at the ground surface, water bottom or water surface. The measurements may be of particle motion, velocity, acceleration or jerk. Example sensors that may be used to make the acoustic measurements include, for example and without limitation, geophones, hydrophones, accelerometers, pressure transducers, and jerkmeters. Additional sensors can be included for calibration and signal-to-noise improvement purposes.

The "baseline" measurements made prior to fracture treating a wellbore or a zone ("stage") within a wellbore will exhibit wave reflections from the bottom of a stage or the bottom of the well and other features characteristic of a given well (collars, obstacles, perforations, surrounding casing/formation or other changes), such reflections having certain characteristics that represent the physical properties and dimensions of the wellbore. The reflected wave characteristics will be different once fracture treatment has taken place and fractures in the formation are connected (through the perforations or other means) to the fracture treatment fluid in the stage and/or to the wellbore.

Next a set of acoustic measurements made as explained above may be performed in the same well or formation after a fracture treatment or individual fracture treatment stage has been pumped. An analysis may then be performed to compare the baseline measurements and the post fracture treatment measurements. Analysis of reflections in such measurements may be used to establish the extent of such hydraulically connected rock volume. This hydraulically connected rock volume may also be compared to estimates of hydraulically connected rock volume from previous stages in a wellbore having multiple fracture stages (this can even utilize other methods such as microseismic to empirically calibrate the measurements). Thus, at least a relative measure between various stages, wells, and reservoir types can be compared. Large or increased connected rock volume is desirable. Based on whether a particular fracture stage or fracture treatment is determined to contribute to the effective connected rock volume to a lesser, same, or greater extent, compared to prior fracture stages of treatments, the wellbore operator may take one or more of the following actions as appropriate:

1) modify the fracture treatment opposite to any previous modification in the event the current fracture treatment or stage is determined to be less effective than (any of) the previous treatment or stage;

2) use the same fracture treatment in the event the current treatment or state is indicated to near to top performance in terms of connected rock volume;

3) further modify subsequent fracture treatments or stages if a prior modification shows improvement to performance in terms of connected rock volume or any other measured relative or absolute parameter of fracture treatment; and 4) perform other operational and stimulation adjustments as necessary or prudent at the wellbore under evaluation or another, similar wellbore.

The foregoing measurement of reflections of waves stimulated in the subsurface (either at the ground surface, in the fluid or in a wellbore) may then be extended to each successive fracture treatment or fracture stage. By monitoring changes to the fracture treatment parameters (such as, but not limited to, fracture fluid composition, proppant concentration ratios, pumping volumes, rates and pressures) it may be possible over time to optimize the fracture treatment parameters from stage to stage to maximize effective hydraulically connected rock volume (or any other parameter suitable to fracture treatment design) in each stage and thus to increase the number of fracture stages that contribute to flow from a given wellbore when it is put on production. Likewise, fracture effectiveness information (e.g., fracture parameters which result in larger surface areas or effective connected rock volume) obtained from one well can be applied to another or next well.

Differences between the reflected waves prior to fracture treatment and after fracture treatment (for example, but not limited to changes in amplitude with respect to time, arrival time of amplitude peaks, dispersion, frequency content, energy content) may enable determining a relationship between the fracture treatment parameters and the actual extent of the fracture network that remains hydraulically connected to the wellbore at any later point in time—for example to determine a relative post-treatment change rate of a measured quantity of interest. A substantial portion of the information about the effective fracture network will be related to properties of the reflected fluid pressure waves (e.g., their amplitude, phase, energy content, frequency and/or time shift, etc.) and later arrivals (with respect to the baseline) of waves reflecting in and from the ends of newly formed fractures, from missing (notched out) frequencies, or from later resonances.

Methods according to the present disclosure may provide rapid feedback as to connected fluid-filled extent of fractures and/or their connectivity for each fracture treatment or stage thereof, and therefore the volume of reservoir rock that the fracture network can effectively drain when on production. The foregoing additional information can be used for production, and stimulation optimization. The wellbore operator can use the relative measures to help improve and optimize the hydraulic fracturing process as quickly as with every stage. Changes to fracture treatment design by the operator that improve the effectiveness of a stage can be retained and enhanced; those that do not can be reduced or eliminated. These learnings are also immediately transferrable to other wellbores.

In an example implementation of a method according to the present disclosure, a source of pressure waves, for example and without limitation a fluid pressure gun, pumps, piezoelectric elements, rapidly closing/opening valves (water hammer), pumps, impact devices, or hammers may be used to induce a sound wave at, near, or in the fluid-filled tubing of a wellbore. Based on well known physical principles, the sound wave produced at, near, or in the well fluid results in detectable tube waves being produced in the fluid-filled portion of the wellbore.

The pressure wave that is produced propagates inside the fluid in the wellbore until it reaches a boundary, such as a bottom of the wellbore, a fracture stage separator, a change in tubing diameter, casing backing change, perforations, rock gradient, or a disturbance (which may be a fracture). The propagating pressure wave will then be at least partially reflected from such boundary and partially absorbed in fractures. Sensors at the surface and/or in the wellbore measure the arrival time, amplitude and signal content of the reflected wave, later arrival waves, and wave superposition often over several up and down reflections. Example sensors that may be used in some embodiments are described above.

The reflected wave(forms) is (are) then analyzed. If the measurements are made prior to pumping any fracture treatment or stage, the measurement of the pressure wave with respect to time may be stored as the "baseline" along with other basic information.

Next, a fracture stage operation, hydraulic stimulation, or other perturbance to the reservoir is performed. During and after such activity takes place, sound waves may be repeatedly induced or introduced and measurements as explained above may be made and analyzed. A portion of the pressure wave that is produced will also enter the fracture, if one is present, and travel through the fracture network as a pressure wave in the fluid, trapped between two elastic media with all the possible reflections, resonances, and losses. Once the activity is completed, additional measurements as above may be made.

The difference between measurements made after the wellbore treatment activity ends, in comparison with the "baseline", may indicate changes in the fluid connectivity of the wellbore with the fracture network formed that will drain that particular reservoir formation or zone therein being treated. The differences between pre-treatment measurements and post-treatment measurements can then be converted to indicate a relative or initial quality of the stimulation stage. This process of baseline measurement, activity, if deemed appropriate—measurement during activity, and measurement post-activity may be repeated for each subsequent treatment stage and learnings from each recorded.

Once any differences between pre-treatment measurements and post-treatment measurements are corrected for known, predictable effects (such as slightly different fluid speeds, distance to end, temperature, pressures, etc.), differences between the pre-treatment measurements and the post treatment measurements and the extent of effective connected rock volume (ECRV) or other parameters of interest between successive or various stages in the wellbore can be used for active decision making for subsequent fracture treatment states and/or other wellbores with similar formation parameters as explained above.

Availability of corrective actions may then be evaluated by the wellbore operator but some basic conclusions can be readily made: If a change in fracture treatment parameter(s) results in improvement to the indicated ECRV, then further changes may be made to the fracture treatment parameters, e.g., increasing the changes made in any one or more fracture treatment parameters. If the ECRV is reduced by such parameter change or changes, the change(s) may be reversed in subsequent stages to reduce the detriment to the ECRV observed. In some embodiments, at least one treatment parameter is repeatedly adjusted so as to maximize contribution to production of all subsequent treatment stages in the wellbore or in any other wellbore. A skilled treatment operator will know the range within which feasible modifications are possible. These considerations can jointly also take into account the changing geology of the formations traversed by the well.

The foregoing process may be repeated from stage to stage and well to well while accumulating additional data on what fracture treatment parameters result in optimum ECRV. The following observations may be made with reference to evaluating any individual fracture stage or treatment.

First, the reflected wave amplitude may decrease as the effective length of the fracture network and ECRV increases; the foregoing effect may be related to dissipation of acoustic energy in the induced fractures.

Second, the arrival time of the latest reflection may indicate the depth of the longest (deepest) connected rock volume branch in a particular induced fracture. When combined with the first measure of energy loss, some relative aspect ratio values can be interpreted for the fracture network.

Third, the frequency content of the reflected wave may change. More dispersion in the spectrum of the reflected wave may be related to more ECRV and additional effects relate to resonances of the borehole, fracture networks/volumes, and their interaction/superposition.

Finally, there may also be some indications of the resonance within the fracture due to waves propagating back and forth along a fracture, emitting a periodic seismic signal. A frequency of the resonance may be related to the effective fluid connected dimension (such as length) of the fracture as demonstrated.

Figure 2:
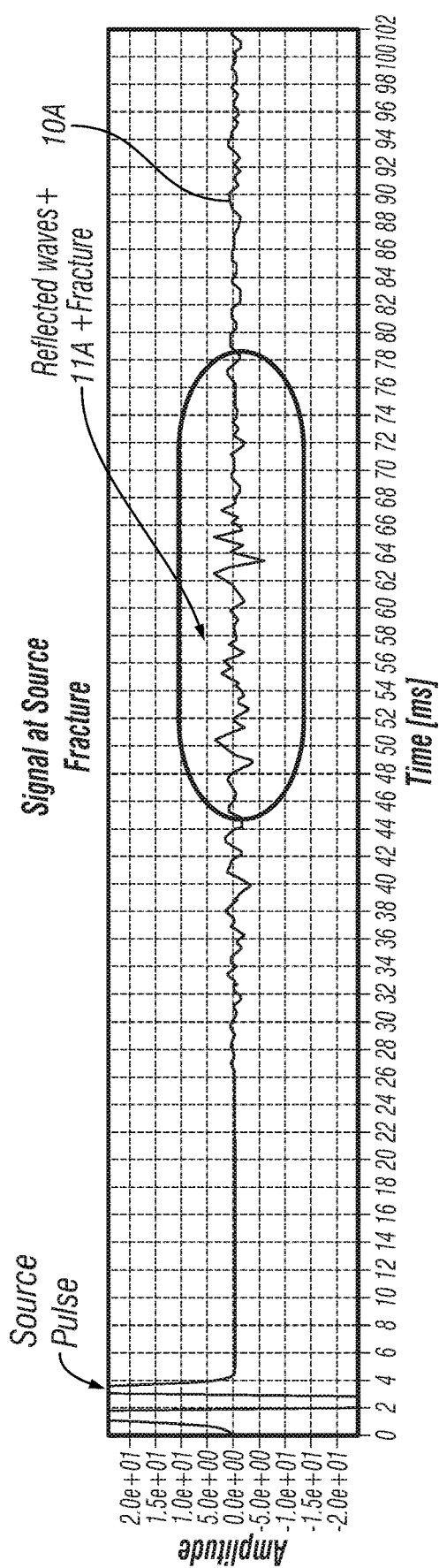
FIG. 2 shows graphs similar to that of FIG. 1 for a well having an open fracture volume in hydraulic communication with the well.
Figure 2:
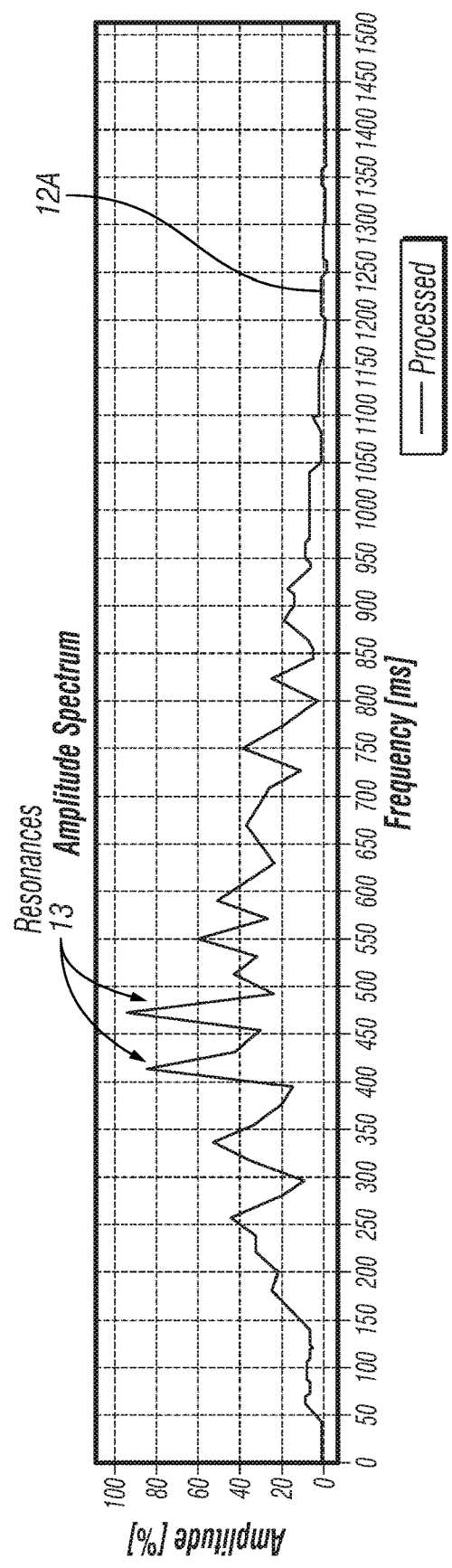

By way of example (times are scaled from actual well times), FIG. 1 shows a graph of acoustic wave amplitude with respect to time at curve 10 in a wellbore (point labeled Source) prior to fracture treatment. A representative graph of amplitude with respect to frequency is shown at curve 12. The amplitude curve 10 shows a distinct amplitude peak 11 at a time of detection of a reflected wave at a particular sensor. The time at which the amplitude peak 11 is measured with reference to the actuation time of the source may be related to the two-way travel time of the tube wave from the source to the bottom of the wellbore or to a fracture stage separator (e.g., a casing or tubing plug). FIG. 2 shows the same two curves 10A, 12A, respectively for the same wellbore after a fracture treatment has been made in a subsurface zone. Reflected waves may be observed at 11A in the time graph (these are a superposition of several wave reflections). The reflected waves 11A may be delayed in time by an amount related to the length of the fracture in the formation created by the fracture treatment, such that they arrive before, during, or after the baseline reflection (64 milliseconds) from the stage end (e.g., a bridge plug). The frequency curve 12A in FIG. 2 may show the presence of resonances related to pressure oscillations in the fracture related to the length thereof, as well as other characteristics relatable to ECRV. Polarity change on reflection would indicate different boundary condition.

Figure 3A:
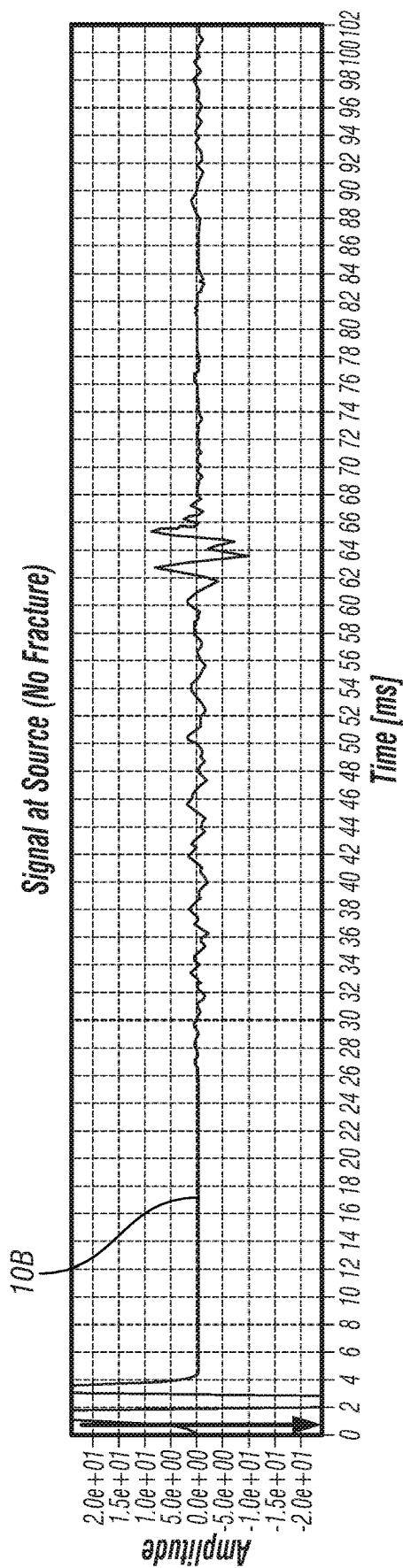
FIGS. 3A and 4A each show a graph of detected pressure.
Figure 4A:
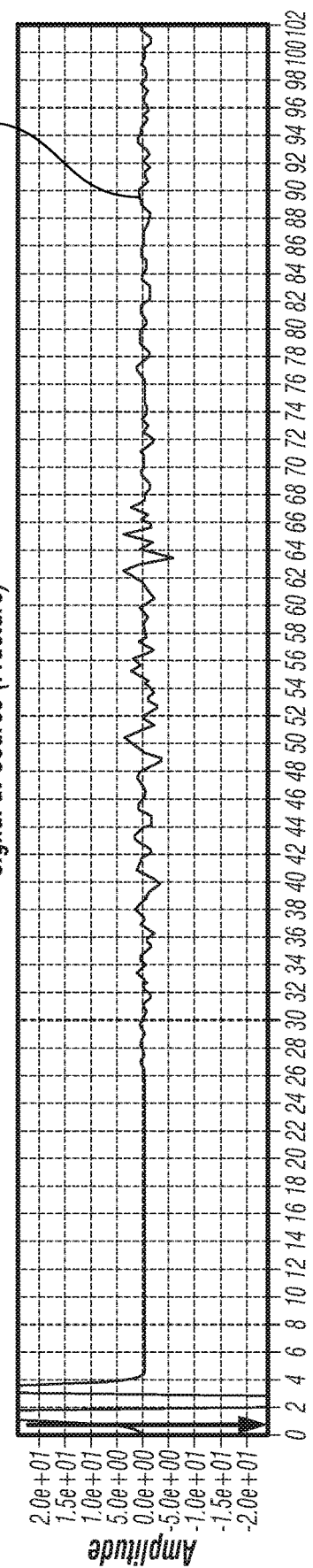
Figure 3B:
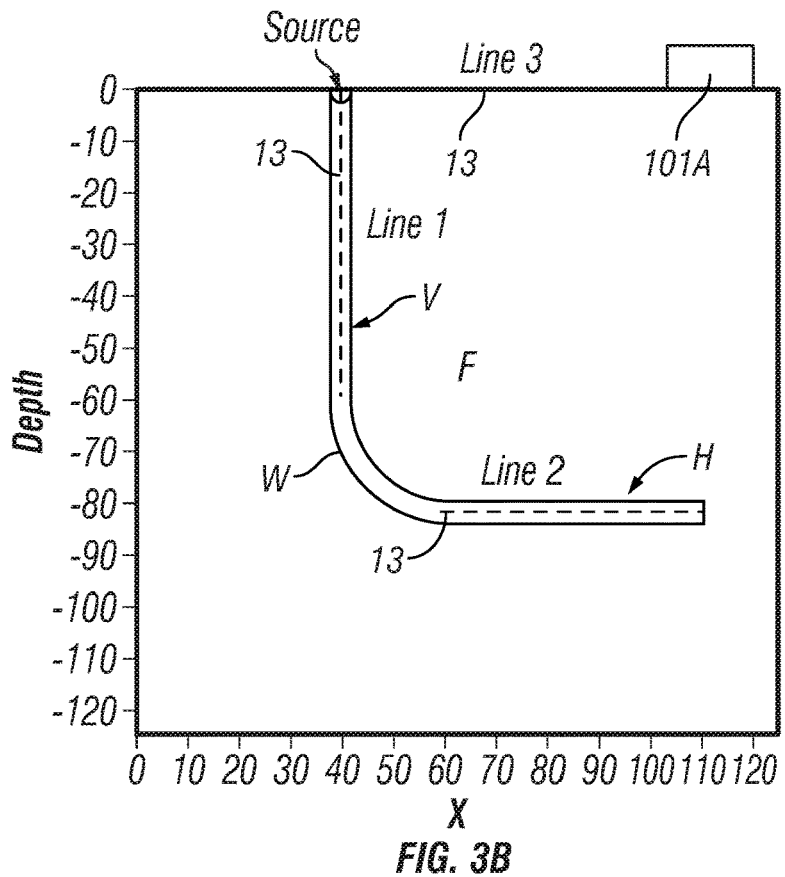
FIGS. 3B and 4B correspond, respectively to FIGS. 3A and 4A and each shows a model of propagating pressure disturbance in the subsurface for a well having two lines of sensors (one line in the vertical portion and one line in the horizontal portion) and a line of sensors deployed on the surface at a time of 10 milliseconds (note that times are on the scale of the simulation; times in actual wellbores are longer and given by scaling parameters) from initiation of a pressure wave in a wellbore.
Figure 4B:
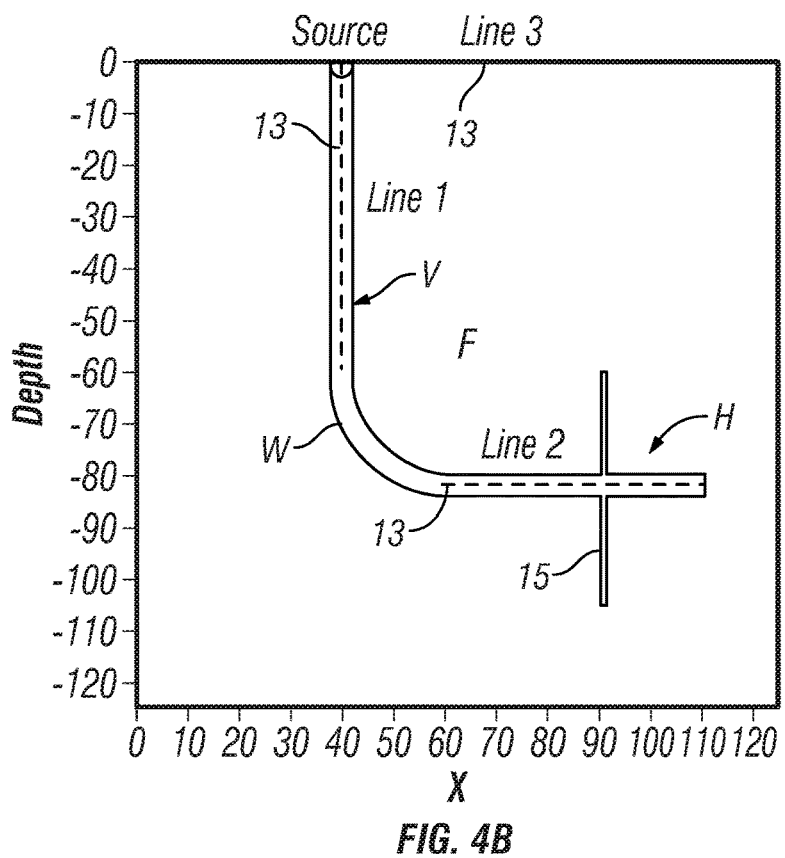

FIGS. 3A and 4A show, respectively, detected signals related to propagation of a pressure wave induced by actuating an acoustic source, or a pressure pulse in a wellbore. The detected signals may be obtained using sensors as explained above. FIGS. 3B and 4B show a model of a well W drilled vertically proximate the surface, and turned to horizontal or a highly inclined angle (e.g., to follow a hydrocarbon rich layer). The well W may comprises a source (Source) proximate the surface for inducing pressure waves in the well W. The well W may comprise two lines (Line 1 and Line 2) of such sensors 13 disposed in the vertical and inclined portions of the well W respectively. A third line (Line 3) of sensors 13 may be disposed along the ground surface in a direction corresponding to the inclined section of the well W, e.g., along a same direction as the sensors 13 in Line 2. Such lines of sensors are not required to implement this disclosure. A single sensor at or near the point of (Source) in FIG. 3B is sufficient.

Acoustic signals may be detected by the three lines Line 1, Line 2, Line 3 of sensors. FIGS. 3A and 4A show amplitude with respect to time graphs at 10B and 12B, respectively. FIGS. 3B and 4B show, respectively, a cross-sectional representation of a well W, having a vertical V and inclined H sections, and drilled through formations F. In FIG. 3B, the well W does not penetrate any fractures in the formations F. In FIG. 4B, a fracture 15 is shown traversing the well W in the inclined section H. The cross sectional representations of FIGS. 3B and 4B correspond to the amplitude with respect to time graphs of FIGS. 3A and 4A, respectively.

FIG. 3B shows a computer system 101A and/or data recording and processing system. The computer system 101A may comprise devices (not shown separately) for processing and recording signals detected by the sensors 13 and to control timing of operation of the source. The computer system is not shown in some of the other drawings for clarity of the illustration. Example embodiments of the computer system will be explained with reference to FIG. 9.

Figure 5A:
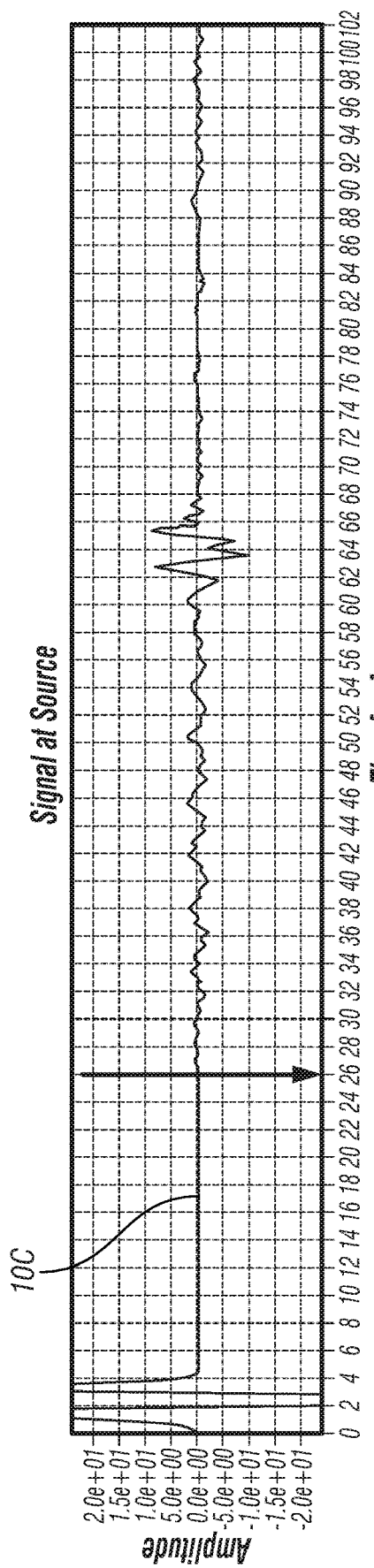
FIGS. 5A and 6A show, respectively, the same features as FIGS. 3A and 4A, but for a time of 26 milliseconds after initiation of the pressure wave.
Figure 6A:
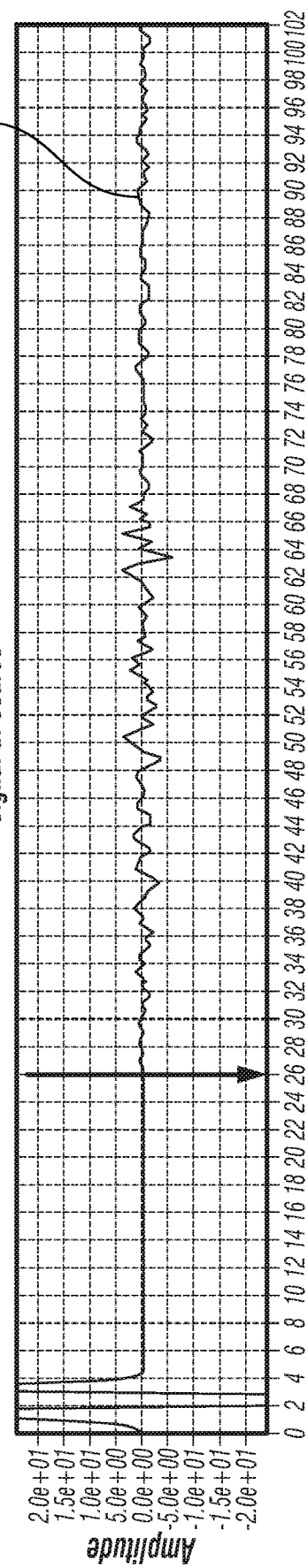
Figure 5B:
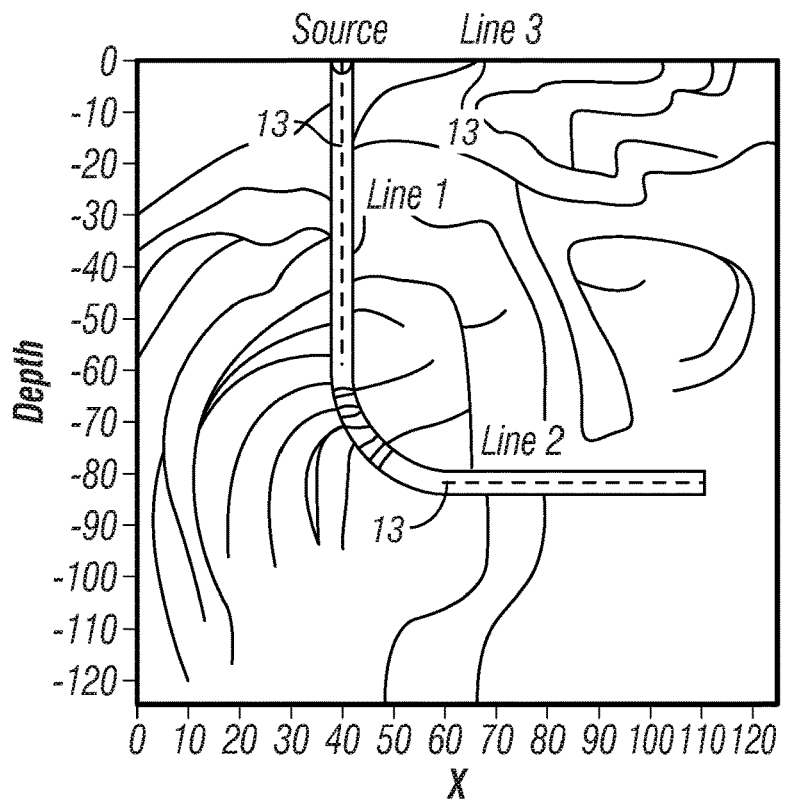
FIGS. 5B and 6B show, respectively, the same features as FIGS. 3B and 4B, respectively at 26 milliseconds.
Figure 6B:
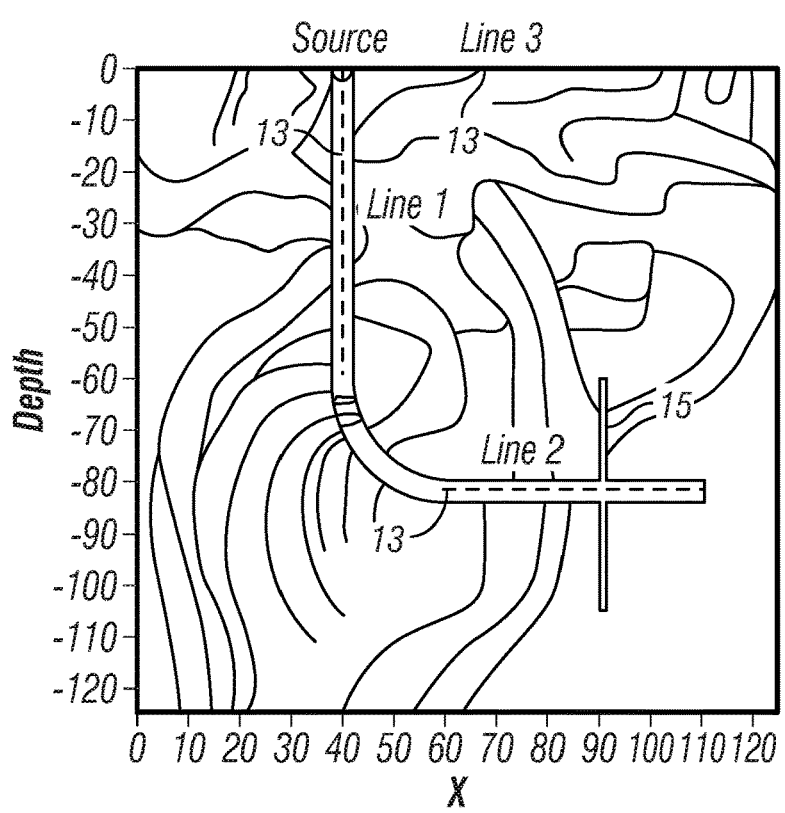

FIGS. 5A and 6A show, respectively, amplitude with respect to time graphs representing propagation of the same tube wave in an untreated wellbore and a fracture treated wellbore as in FIGS. 3A and 4A, but at a time of 26 milliseconds from actuation of the source. Corresponding amplitude/time curves are shown at 10C and 12C, respectively. FIGS. 5B and 6B show cross-sectional models of propagation of pressure waves corresponding to the models shown in FIGS. 3B and 4B, respectively.

Figure 7A:
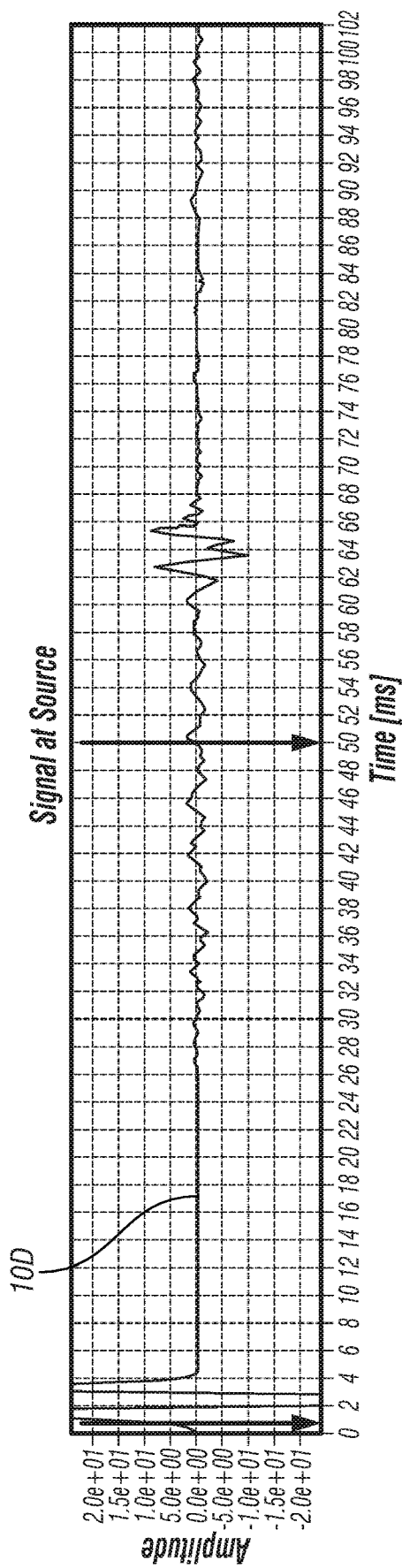
FIGS. 7A and 8A show, respectively, the same features as FIGS. 3A and 4A, but for a time of 50 milliseconds after initiation of the pressure wave.
Figure 8A:
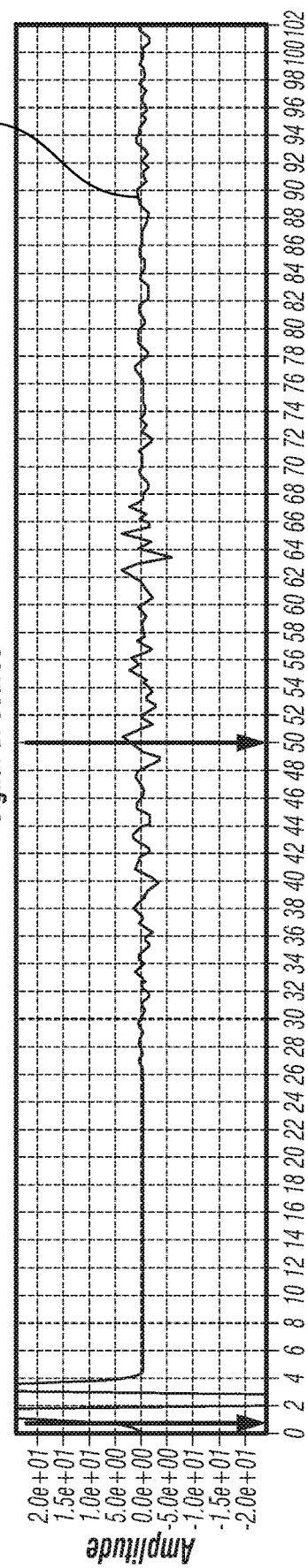
Figure 7B:
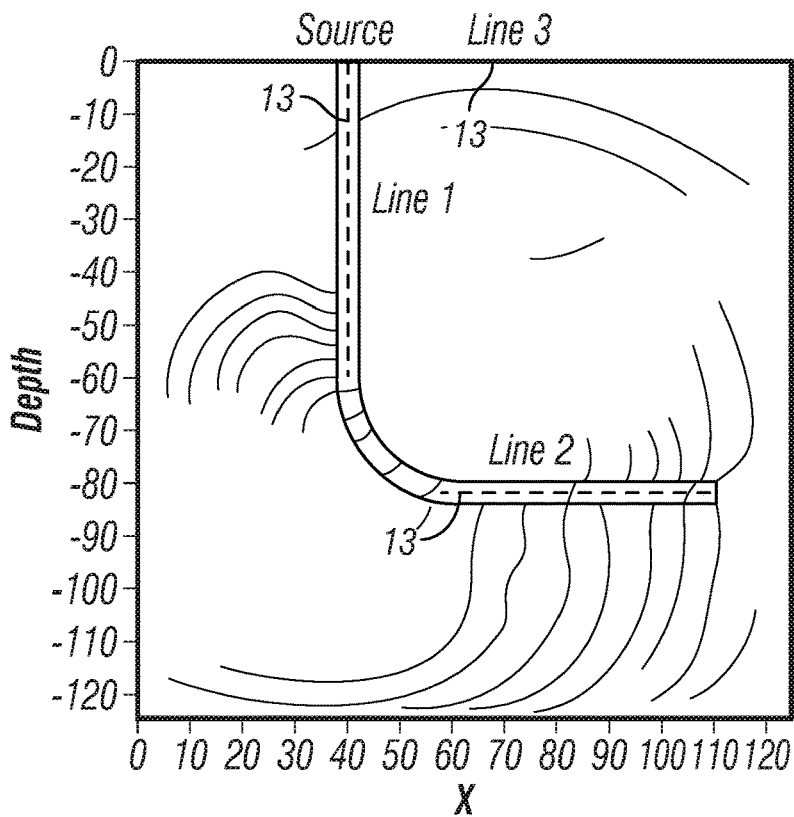
FIGS. 7B and 8B show, respectively, the same features as FIGS. 3B and 4B also at 50 milliseconds after pressure wave initiation.
Figure 8B:
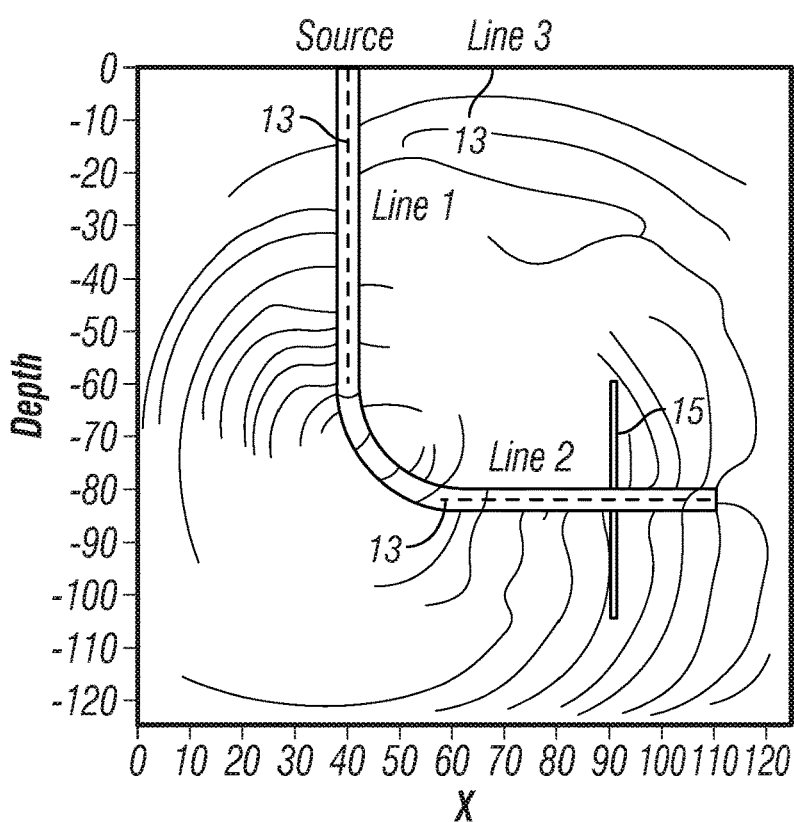

FIGS. 7A and 8A show, respectively, amplitude with respect to time graphs representing propagation of the same tube wave in the untreated wellbore and in the fracture treated wellbore at a time of 50 milliseconds from actuation of the source. Corresponding amplitude/time curves are shown at 10D, 12D. The differences between the two curves due to the presence of the fracture (15 in FIG. 8B) may be observed between FIGS. 7A and 8A. The time values shown in FIGS. 7A and 8A are simulated times.—Time values in actual wells may be substantially larger because the tube wave speed is on the order of 1200 meters/second. Cross-sectional models of the propagating wave with reference to the well W are shown in FIGS. 7B and 8B, respectively for a well W without a fracture in FIG. 7B and with a fracture 15 in FIG. 8B.

Figure 9:
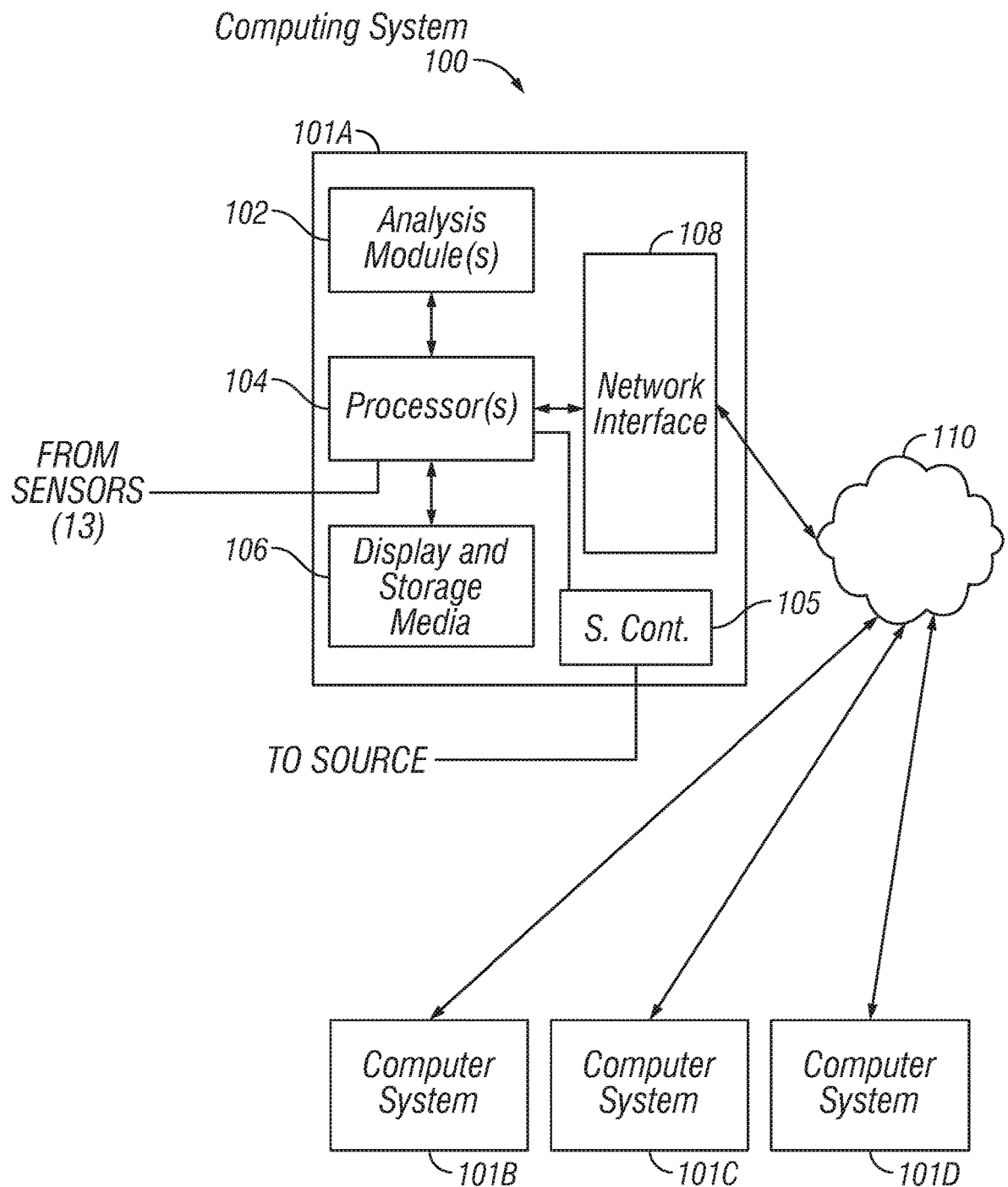
FIG. 9 shows an example computer system that may be used in some embodiments.

FIG. 9 shows an example computing system 100 in accordance with some embodiments. The computing system 100 may be an individual computer system 101A (also shown in FIG. 3B) or an arrangement of distributed computer systems. The individual computer system 101A may include one or more analysis modules 102 that may be configured to perform various tasks according to some embodiments, such as the tasks explained with reference to FIGS. 3A through 8B. To perform these various tasks, the analysis module 102 may operate independently or in coordination with one or more processors 104, which may be connected to one or more storage media 106. A display and storage device (not shown) such as a graphic user interface of any known type may be in signal communication with the processor 104 to enable user entry of commands and/or data and to display results of execution of a set of instructions according to the present disclosure.

The processor 104 may have circuitry or software for detecting and processing signals from the sensors (13 in FIG. 3B). The processor 104 may also be in signal communication with a source controller 105 to actuate the source (FIG. 3B) at selected times and thereby index the time of recording of the detected signals with reference to actuation of the source.

The processor(s) 104 may also be connected to a network interface 108 to allow the individual computer system 101A to communicate over a data network 110 with one or more additional individual computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be at a well location, while in communication with one or more computer systems such as 101C and/or 101D that may be located in one or more data centers nearby, on shore, aboard ships, and/or located in varying countries on different continents).

A processor may include, without limitation, a microprocessor, microcontroller, processor module or subsystem, programmable integrated circuit, programmable gate array, or another control or computing device.

The storage media 106 may be implemented as one or more computer-readable or machine-readable storage media. Note that while in the example embodiment of FIG. 9 the storage media 106 are shown as being disposed within the individual computer system 101A, in some embodiments, the storage media 106 may be distributed within and/or across multiple internal and/or external enclosures of the individual computing system 101A and/or additional computing systems, e.g., 101B, 101C, 101D. Storage media 106 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing system having one or more nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that any other embodiment of a computing system may have more or fewer components than shown, may combine additional components not shown in the example embodiment of FIG. 9, and/or the computing system 100 may have a different configuration or arrangement of the components shown in FIG. 9. The various components shown in FIG. 9 may be implemented in hardware, software, or a combination of both hardware and software, including one or more signal processing and/or application specific integrated circuits.

Further, the acts of the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for evaluating a wellbore treatment, comprising:
   inducing a controlled acoustic or pressure wave in the wellbore prior to a treatment in a first treatment stage thereof;
   detecting acoustic energy propagating as tube waves in the wellbore;
   determining an effective hydraulically connected rock volume in a formation surrounding the wellbore in the first treatment stage using a frequency of resonance in the detected acoustic energy;
   treating the formation surrounding the wellbore and in fluid communication with the wellbore in the first treatment stage;
   repeating the inducing a controlled acoustic or pressure wave, detecting acoustic energy and determining the effective hydraulically connected rock volume in the first stage;
   inducing a controlled acoustic or pressure wave, detecting acoustic energy and determining the effective hydraulically connected rock volume in a second treatment stage;
   treating the formation in the second treatment stage with at least one treatment parameter changed from the treatment in the first treatment stage, the at least one parameter being changed based on differences between the determined hydraulically connected rock volume prior to the treating and after the treating in the first treatment stage;
   then repeating the inducing a controlled acoustic or pressure wave, detecting acoustic energy and determining the effective hydraulically connected rock volume in the second treatment stage;
   evaluating effectiveness of the at least one changed treatment parameter based on differences between the determined hydraulically connected rock volume prior to the treating with the at least one changed treatment parameter and after the treating with the at least one changed treatment parameter in the second treatment stage; and
   prior to treating a third treatment stage, changing the at least one treatment parameter based on the evaluated effectiveness of the at least one changed parameter.

2. The method of claim 1 wherein the first and second treatment stages comprise hydraulic fracturing.

3. The method of claim 2 wherein the determining effective hydraulically connected rock volume comprises determining at least one of fracture network surface area, fracture extent and fracture density.

4. The method of claim 3 wherein the at least one of fracture network surface area, fracture extent, and fracture density is determined by determining changes in at least one of amplitude with respect to time, arrival time of amplitude peaks, dispersion, frequency content, energy content frequency, resonant frequency or its width, superposition, and energy content of one or more reflected portion(s) of the induced acoustic wave.

5. The method of claim 3 wherein at least one of fracture network surface area, fracture extent and fracture density is determined by determining changes in dispersion of the induced acoustic wave.

6. The method of claim 3 wherein at least one of a fracture length, permeability, fracture extent, fracture density, and fracture network surface area, is determined by a change in waveform characteristics of the detected acoustic energy.

7. The method of claim 1 further comprising, in a later treatment stage, repeating the treating a formation, repeating the inducing a controlled acoustic or pressure wave and detecting acoustic energy after the repeated treating, and evaluating variability of results between treatments with no changes in treatment parameters between the treatments.

8. The method of claim 1 wherein the treating comprises hydraulic fracturing and the at least one parameter comprises one of fracture fluid pumping rate, fracture fluid pumping pressure, fracture fluid composition, and fracture fluid proppant ratio or quantities of sand, liquids, or chemical(s) pumped.

9. The method of claim 8 wherein the effective hydraulically connected rock volume in a treated stage is monitored and determined for a period of time after the treating is completed in the treated stage.

10. The method of claim 1, wherein the at least one treatment parameter is repeatedly adjusted between successive treatments to maximize overall contribution to production of all subsequent treatments in the wellbore.

\* \* \* \* \*